W. J. CARROLL.
Cotton-Bale Ties.
No. 6,043. Reissued Sept. 8, 1874.
FIG. I.
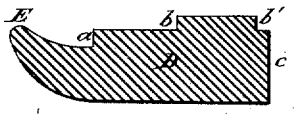
FIG. II.
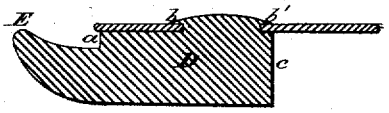
FIG. III.
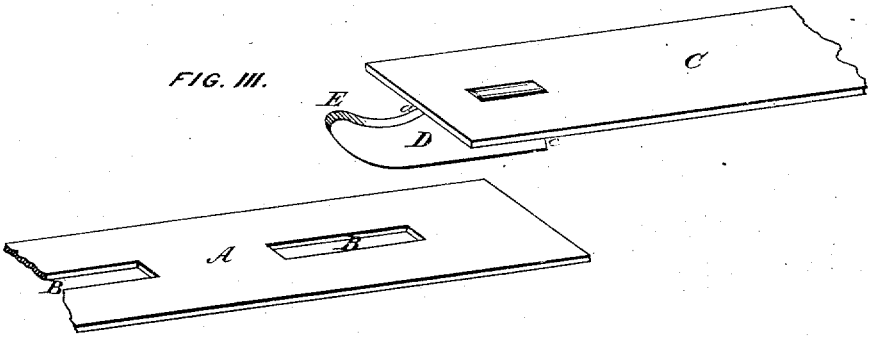
FIG. IV.
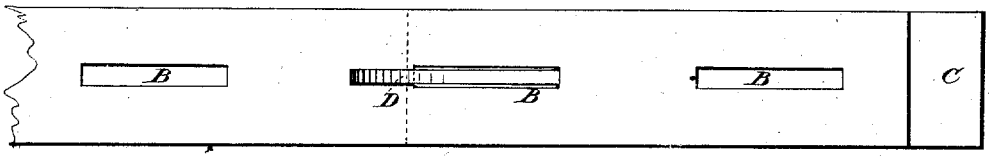
FIG. V.
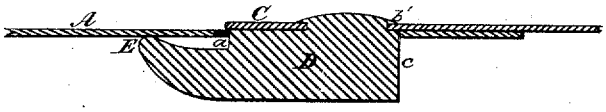
WITNESSES:
R. H. Whittlesey
M. F. Halleck
INVENTOR:
William J. Carroll
by Bakewell & Kerr
Attorneys
THE GRAPHIC CO. PHOTO-LITH. 39 & 41 PARK PLACE, N.Y.

UNITED STATES PATENT OFFICE.

WILLIAM J. CARROLL, OF NATCHEZ, MISSISSIPPI, ASSIGNOR TO THE PLANTERS' COTTON-TIE ASSOCIATION, OF NEW ORLEANS, LA.

IMPROVEMENT IN COTTON-BALE TIES.

Specification forming part of Letters Patent No. 114,760, dated May 16, 1871; antedated May 12, 1871; reissue No. 5,912, dated June 16, 1874; reissue No. 6,043, dated September 8, 1874; application filed September 2, 1874.

*To all whom it may concern:*

Be it known that I, WILLIAM J. CARROLL, of Natchez, in the county of Adams and State of Mississippi, have invented a new and useful Improvement in Cotton-Bale Tie; and I do hereby declare the following to be a full, clear, and exact description thereof, reference being had to the accompanying drawing, and to the letters of reference marked thereon, making part of this specification, in which—

Figure 1 is a detached view of my improved cleat or fastening. Fig. 2 represents the above cleat riveted to one-half of a bale-band in such a manner that the curved or hooked end of the said cleat shall project beyond the ends of the band. Fig. 3 represents the opposite ends of the band brought nearly together preparatory to the locking or fastening the same. Fig. 4 represents the under side of the band, or the side next the bale after the fastening is made; and Fig. 5 is a vertical longitudinal section of the cleat and of both ends of the band when locked together.

The curved forward end or toe of the cleat projects beyond the end of the band, to which it is attached, in order that it may be conveniently slipped into one or the other of the elongated slots in the opposite end of the band.

The cleat D is made of metal, of the shape shown in Fig. 1, with its forward end or toe E curved upward, so as nearly or quite to reach an imaginary line drawn horizontally from the top of the step *a*, said line corresponding to the under surface of the bale-band, so that in practice the point or curved end E will press against the under side of the opposite end of the band, and thereby receive the fastening of the same.

The step at *a* forms a shoulder, and the step *b b'* forms a rivet, by which the cleat is attached to the band, so that the whole of the upper surface from *a* to *b* impinges against the band to which the cleat is attached, thus increasing the leverage or resisting power of the rivet, as shown at Fig. 2.

This tie may be easily unfastened when desired, by simply slipping a flat tool between the band behind the cleat, thereby raising the heel of the same until it comes above the edge of the slot, when the band is at once loosened; and in order to facilitate the unfastening, as above specified, the rear end of the cleat is preferably made square, so as to stand at or about a right angle to the under surface of the band to which it is riveted, so that it may readily escape from the slot in unlocking the tie.

This facility for unfastening by so simple an action, while not detracting in the least from its strength and security when in use, enables the sampler or buyer of the cotton or other merchandise to remove one or more bands from the bale without cutting or injuring it in the least—a feature peculiar to this device as a bale-tie.

Immediately behind the point E or curved toe of the cleat the metal is preferably removed from the same, as shown in the drawing, in order that the rough edges or fringes of metal which may be left around the slots in the opposite end of the band may not interfere with the cleat, but leave the rounded point or toe of the cleat free to engage the under surface of the opposite end of the band when the fastening is made.

Having thus described my invention, what I claim as new, and desire to secure by Letters Patent, is—

1. In combination with the slotted bale-band, a cleat provided with an extension or toe at its forward end projecting beyond the end of the band to which it is attached, and reaching upward, so as when locked to rest against the under side of the other end of the band, substantially as described.

2. In combination with the slotted bale-band, a cleat extending beyond the end of the band and having a forwardly-projecting and upwardly-extending toe and a square heel, substantially as described.

In witness whereof I, the said WILLIAM J. CARROLL, have hereunto set my hand.

WILLIAM J. CARROLL. [L. S.]

Witnesses:

WM. F. MELLEN,

A. BOTSAI.